United States Patent [19]

Pike

[11] Patent Number: 4,555,775

[45] Date of Patent: Nov. 26, 1985

[54] DYNAMIC GENERATION AND OVERLAYING OF GRAPHIC WINDOWS FOR MULTIPLE ACTIVE PROGRAM STORAGE AREAS

[75] Inventor: Robert C. Pike, Berkeley Heights, N.J.

[73] Assignee: AT&T Bell Laboratories, Murray Hill, N.J.

[21] Appl. No.: 433,261

[22] Filed: Oct. 7, 1982

[51] Int. Cl.$^4$ .......................... G06F 3/00; G06F 7/00; G06K 15/18

[52] U.S. Cl. ..................................... 364/900; 340/734

[58] Field of Search ... 364/200 MS File, 900 MS File, 364/300 MS, 518, 521; 340/734, 721, 745

[56] References Cited

U.S. PATENT DOCUMENTS

| | | | |
|---|---|---|---|
| Re. 31,200 | 4/1983 | Sukonick et al. | 340/734 |
| 3,534,338 | 10/1970 | Christensen et al. | 340/172.5 |
| 3,537,096 | 10/1970 | Hatfield | 340/734 |
| 3,675,232 | 7/1972 | Strout | 340/790 |
| 3,906,197 | 9/1975 | Grover | 340/734 |
| 3,973,245 | 8/1976 | Belser | 364/200 |
| 4,110,823 | 8/1978 | Cronshaw et al. | 364/200 |
| 4,414,628 | 11/1983 | Ahuja et al. | 340/721 |
| 4,428,065 | 1/1984 | Duvall et al. | 364/900 |
| 4,450,442 | 5/1984 | Tanaka | 340/721 |

OTHER PUBLICATIONS

"The Smalltalk-80 System" by Xerox Learning Research Group, Byte Publications, Inc., vol. 6, No. 8, Aug. 1981, pp. 36–47.

"The Smalltalk Graphics Kernel" by D. H. H. Ingalls, Byte Publications, Inc., vol. 6, No. 8, Aug. 1981, pp. 168–194.

"The Smalltalk Environment" by L. Tesler, Byte Publications, Inc., vol. 6, No. 8, Aug. 1981, pp. 90–147.

*Primary Examiner*—James D. Thomas
*Assistant Examiner*—William G. Niessen
*Attorney, Agent, or Firm*—Robert O. Nimtz

[57] ABSTRACT

A graphic terminal is disclosed using bitmaps to represent plural overlapping displays. Graphics software is also disclosed in which the overlapping asynchronous windows or layers are manipulated by manipulating the bitmaps. With this software, the physical screen becomes several logical screens (layers) all running simultaneously, any one of which may be interacted with at any time.

15 Claims, 5 Drawing Figures

DYNAMIC GENERATION AND OVERLAYING OF GRAPHIC WINDOWS FOR MULTIPLE ACTIVE PROGRAM STORAGE AREAS

TECHNICAL FIELD

This invention relates to interactive computer graphics and, more particularly, to the manipulation of overlapping asynchronous windows, or layers, in a bitmap display terminal.

BACKGROUND OF THE INVENTION

The displays on graphical computer terminals are generated by reading a "bitmap" (i.e., a storage array of "1s" and "0s" corresponding to the intensity pattern of the display screen) and using the bits to intensity-modulate the electron beam of the cathode ray tube. The display is maintained by re-reading the bitmap at the frame rate of the display screen. Changes in the display are accomplished by changing the bitmap. Bits can be erased to remove display segments, or new bit patterns can be ORed with the existing bit pattern to create an overlay in the bitmap.

It is well known to break the bitmap, and hence the display, into a plurality of regions for separate displays. Each separate display is called a "window" and the prior art has the ability to display multiple windows simultaneously, with several if not all windows overlapping, leaving one window fully visible and the others partially or wholly obscured. Windows are overlapping rectangles each of which can be considered an operating environment, much like sheets of paper on a desk. One limitation of the prior art is that only the window at the front, which is totally unobscured, is active or continuously operating. The user is therefore limited to interacting with only the one active window and is prevented from operating on any of the obscured areas. The windows are typically not independent; each is supported by a separate subroutine in a single large program.

While the user interacts with the active window, all the remaining window programs are executing, but the results are not visible on the screen. If the user wants to view the progress of a particular program, it is necessary to poll the inactive windows periodically. This polling requires interrupting the users current work on the one active window in order to call up the desired window. At this point the bitmap for the obscured window would have to be updated in order to be displayed on the cathode ray tube (CRT) in the current state. One such system is the Xerox Smalltalk-80 system described in Vol. 6, No. 8, of the publication, *BYTE*, McGraw-Hill, August 1981.

SUMMARY OF THE INVENTION

In accordance with the illustrative embodiment of the present invention, bitmap layers (windows) are always active, regardless of their visibility. The physical screen of the display is represented by a plurality of logical bitmaps (layers) at once, each corresponding to a program. Each bitmap is updated by the respective program assigned it. Complete and current bitmaps for all of the layers are therefore continually available in the bitmap memory. The layer bitmaps are independent of each other and each is controlled by a separate, independent process, all operating concurrently. For each layer bitmap, there is a corresponding host program which allows each layer to be operating continuously.

Each layer is logically a complete terminal with all the capabilities of the original.

The user can only operate in one layer at a time. While he is doing so, the output from the other layer programs are still visible on the screen, albeit partially obscured. Even the obscured portions of the layers have complete bitmaps associated therewith to maintain a current view of the layer. This process is extremely convenient in practice, in that the user can run independent processes-and review their progress without having to poll each separate layer periodically.

In further accord with the present invention, the bitmaps for the partially or totally obscured layers are maintained in storage as a linked list of the obscured rectangles of the display. Each bitmap, then, is a combination of visible portions and an obscured list of areas obscured by layers closer to the face of the display. The visible portion of the bottom layer bitmap is generated by subtracting common rectangular areas of all higher level layers (i.e., layers closer to the face of the display). Visible portions of succeedingly higher level layers are generated by subtracting rectangular areas of all higher level bitmap segments. The top of the list is a specification of the physical size and position of the layer. The bitmap for obscured portions of each layer is then represented in memory as a linked list of pointers to the bitmaps for obscured portions of that layer.

By providing separate bitmaps for all of the layers, by keeping each bitmap current independently, and by displaying only the visible segments of each, a user has at his disposal a plurality of virtual terminals, all running simultaneously, and any one of which may be interacted with at any time.

DETAILED DESCRIPTION

Figure 1:
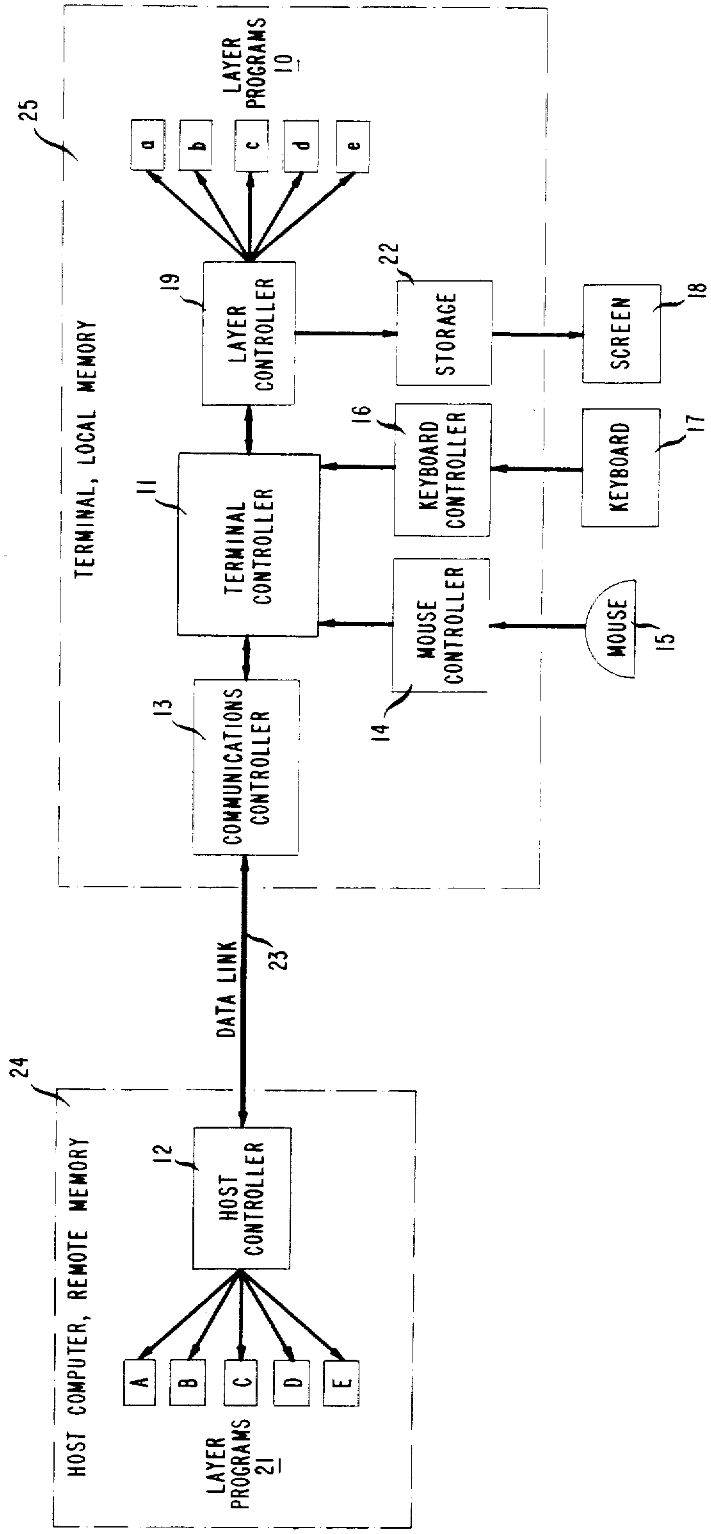
FIG. 1 is a general block diagram of a computer-supported display system implementing the principles of the present invention.

Referring more particularly to FIG. 1, there is shown a generalized block diagram illustrating a computer-supported display system in accordance with the present invention. The system of FIG. 1 includes a local terminal computer memory 25 and a remote host computer memory 24, interconnected by a data link 23. Interacting computer programs (software) reside in both the host computer 24 and the terminal 25. The communications controller program 13 and the host controller program 12 manage the communications data link 23. Terminal controller 11 and host controller 12 each also manage multiple processes 10 and 21, respectively, in its own environment, and multiplex their communications into a single stream for transmission on the data link 23. The controller program 12 or 13 on the other end does the demultiplexing, as well as routing messages to the proper destination. Such divided control of graphical displays is disclosed in Christensen et al U.S. Pat. No. 3,534,338 granted Oct. 13, 1970.

The terminal controller 11 exercises supervisory control over multiple processes, including the keyboard controller 16, the mouse controller 14,, the communications controller 13 and the layer controller 19. The keyboard controller 16 collects ASCII coded signals representing keyboard characters and forwards them through controller 19 to the proper program 10. Mouse 15 is a well-known graphical input device which controls the position of a cursor on the screen and provides a plurality of control keys for modifying the display. Such devices are well known and are described in the above-identified issue of *BYTE Publications, Inc.* The mouse controller program 14 assigns the mouse 15 to one of the displayed layer programs 10. The communications controller 13 manages communications through the data link 23 with the host computer 24 for each layer program 10. The layer controller program 19 is responsible for keeping the contents and visibility of each layer correct and current in response to the execution of layer programs 10 and 21. Each layer is kept up to date, regardless of whether it is currently visible, overlapped or totally obscured.

Terminal controller 11, in combination with mouse 15 and mouse controller 14, provides the user with the ability to create a layer of any size at any position on the cathode ray tube (CRT) 18, by pointing with the cursor under the control of mouse 15. The mouse 15 is a peripheral device which makes possible interactions that are not as convenient with just a keyboard 17 alone. Pushing a button on the mouse 15, for example, can control the display of a self-explanatory menu of commands. Users can switch their attention to any layer on the screen 18 or bring it to the top of the display by pointing the mouse 15 at an unobstructed portion of the layer and pushing a button.

When a layer is created, a copy of a terminal simulating program 10 is associated with it in the terminal local memory 25, and a separate executing command interpreter program 21 is associated with it on the host computer 24. Thus, each user "program" is implemented as two cooperating programs, one that runs in the terminal 25 and one that runs on host computer 24, exchanging information via the data link 12.

The actual rectangular images of all of the layers on the screen 18 are recorded in bitmap memory 22. Storage medium 22 is a block of storage which lends itself to storing rectangular bitmaps which can be used to create images on the screen 18.

Figure 2:
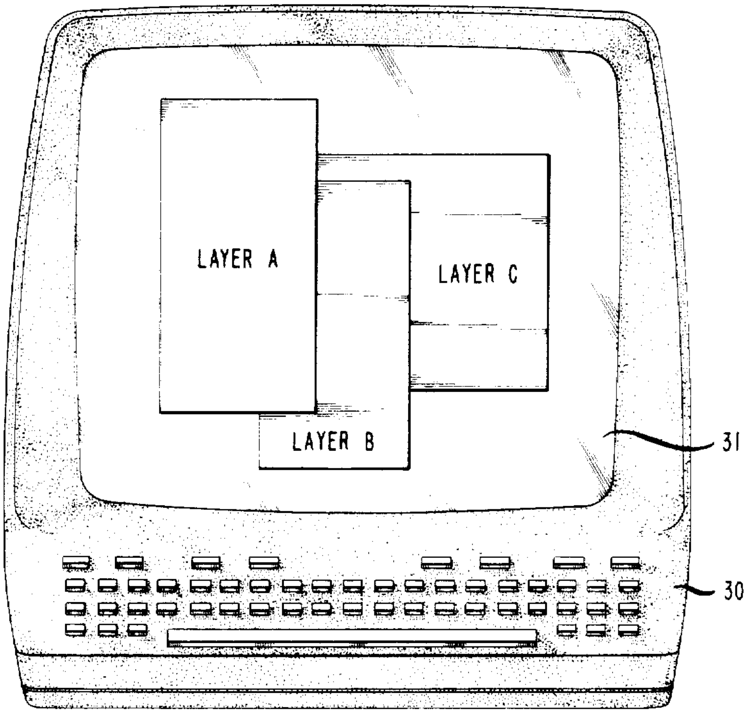
FIG. 2 is a graphical representation of a computer terminal with a display screen illustrating overlapping layers.

FIG. 2 is a front view of a terminal 30 with a screen 31 depicting three overlapping layers A, B and C as they would actually appear on a cathode ray tube (CRT) screen 31. A "layer" in this sense, is a rectangular portion of the screen 31 and its associated image. It may be thought of as a virtual display screen since it comprises a graphical or visual environment in which a user can do any thing that could be done on an entire screen. Layers may overlap as shown in FIG. 2, but a set of bitmaps capable of maintaining an image of the obscured portion of a layer is always kept current. Because all processes are asynchronous, drawing actions can be directed at any time to an obscured layer, and a resulting graphical object such as a line will be partially visible on the screen and partially recorded in the bitmaps representing the obscured portions of the layer.

Bitmap layer A in FIG. 2 is the only unobscured layer. Layer B is partially obscured by layer A while layer C is partially obscured by both layer A and layer B. While an operator can interact with these layers only one-at-a-time, the programs 21 (FIG. 1) continually update the bitmaps corresponding to these layers, in both the visible and obscured portions.

Figure 3:
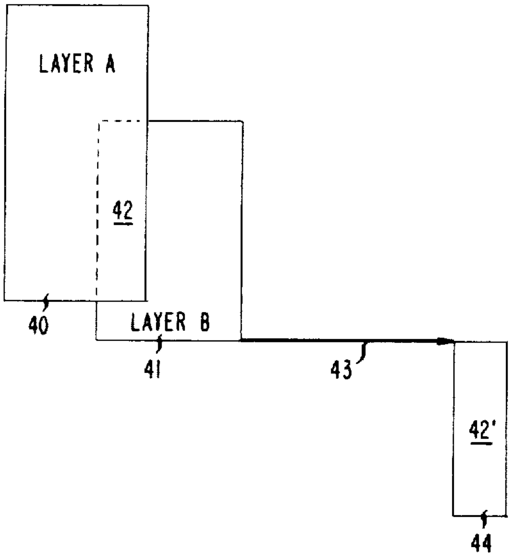
FIG. 3 is a graphical representation of the linked bitmaps required to represent the top two layers of the display illustrated in FIG. 2.

Referring more particularly to FIG. 3, there is shown an example of overlayed layers in a terminal such as that shown in FIG. 2. Reference numeral 40 indicates the top layer, layer A, while reference numeral 41 indicates a bottom partially obscured layer B. It can be seen that the rectangular area 42 which constitutes part of bitmap 41 is obscured in the display by the overlapping portion of laye A, shown as bitmap 40. Since the obscured portion 42 will not be displayed on the screen, it is necessary to provide a bitmap storage for the obscured rectangle. Partial bitmap 44 serves this purpose. Bitmap 41 is linked to bitmap 44 by a pointer 43 illustrated in the drawing as a directed arrow. The entire bitmap for layer B includes the unobscured portion of layer B in bitmap 41, plus the obscured portion 44, stored in a nondisplayed portion of the terminal memory.

To programs operating on the bitmaps, the displayed and obscured portions are linked together in such a fashion that bitmap operators can operate on the entire bitmap whether or not displayed. To this end, the computer software maintains an obscured bitmap list comprising nothin more than a sequence of pointers to the obscured bitmap areas. This list is used to construct a bitmap of the entire area for purposes of recording in the bitmap the results of programs executing in the corresponding layer. This can be better seen in the schematic diagram of FIG. 4.

Figure 4:
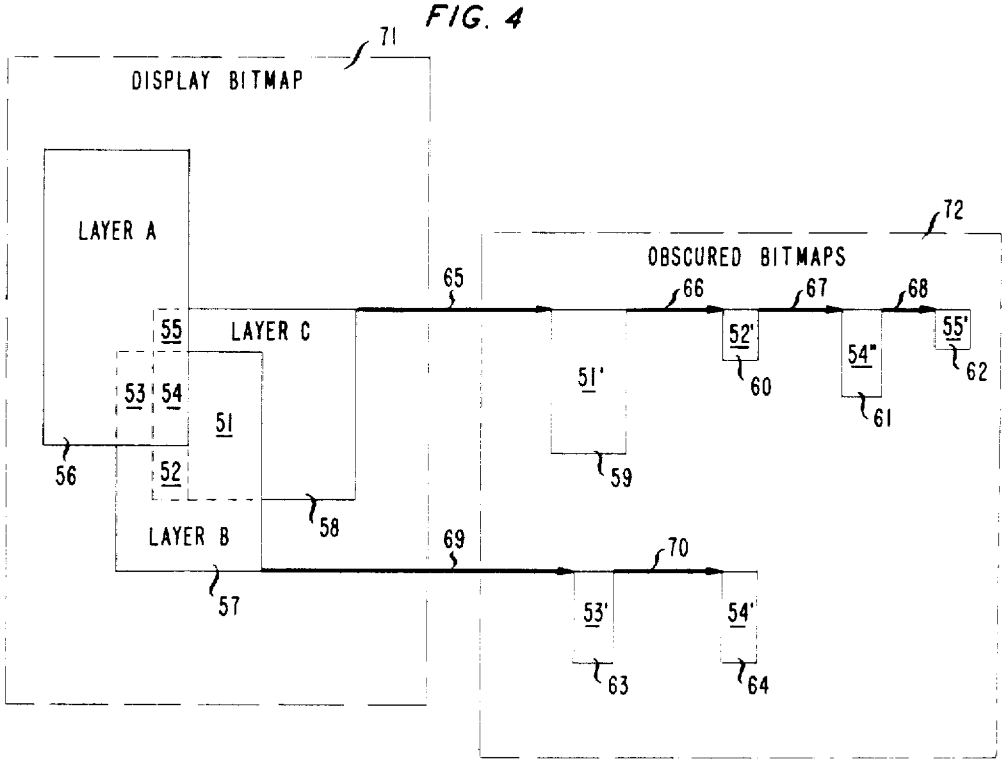
FIG. 4 is a graphical representation of the linked bitmaps required to represent all three of the layers in the display illustrated in FIG. 2.

Referring then to FIG. 4, there is shown a schematic diagram of the bitmap storage areas necessary to represent the layers illustrated in FIG. 2. Thus, reference numeral 71 represents a bitmap of the entire display area which includes three layers, 56, 57 and 58, identified as layers A, B and C, respectively.

As can be seen in FIG. 4, bitmap 56 overlays and thus obscures portions of both bitmap 57 and bitmap 58. Moreover, bitmap 57 also overlays portions of bitmap 58. Since these various obscured portions will not be visible on the screen display, storage for the obscured portions of the bitmap must be maintained so that these portions can be updated concurrently with the execution of the corresponding programs. It can thus be seen that partial bitmap 59 in storage area 72 is used to store the bitmap of the area 51 of layer C obscured by layer B. Similarly, the partial bitmap 60 is used to store the bitmap of layer C obscured by layer B. It will be noted that all obscured portions of the various layers are divided into rectangular areas in order to ease processing.

The obscured area 54 represents an area of layer B obscured by layer A and also represents a portion of layer C obscured by layer B. Thus, the area 54 requires two partial bitmaps, bitmap 61 and bitmap 64, to represent the obscured portions of layers C and B, respectively. The bitmap portions are connected to the associated layers and to each other by directed arrows 65, 66, 67 and 68 for layer C and 69 and 70 for layer B. These directed arrows represent graphically the obscured list for each layer. These pointers are used during processing to update the bitmaps associated with each layer. The fact that a layer bitmap is actually composed of several disassociated parts, is a fact that is transparent to the graphical primitives. These areas are reassembled logically to permit direct bitmap operations on a virtual bitmap of the entire layer. Only unobscured portions, of course, are actually displayed on the terminal screen.

It will be noted that the obscured area 53,54 is divided into two pieces, 53 and 54, depending on what layers have obscured these areas. Although this area could be created as a single entity, for purposes of updating layer B, it is convenient to provide the breakdown shown in FIG. 4. If the layers are rearranged, the algorithms for dealing with the single and double obscured areas are greatly simplified. For this reason, these subdivisions are made when the layer is first created, and the positions and dimensions of the layer are made available to the software.

In Appendix A, there is shown a data structure declaration using the conventions of the C language, as described in *The C Programming Language* by B. W. Kernighan and D. M. Ritchie, Prentice-Hall, 1978, for the bitmap arrays.

The individual layers are chained together in the memory as a double-linked list in order, from the "front" to the "back" of the screen. Of course, if they do not overlap, the order is irrelevant. In addition to the linked layers, each layer structure contains a pointer to a list of obscured rectangles and to the bounding rectangle on the screen. The obscured lists are also doubly-linked, but in no particular order. Each element in the obscured list points to the bitmap for storing the off-screen image and contains a pointer to the next-adjacent layer toward the front which obscures it.

Returning to FIG. 1, the various elements depicted are generally well-known in the prior art. The hardware elements, such as mouse 15, keyboard 17, and screen 18, are identical to such elements in the prior art and, indeed, may be purchased as off-the-shelf items for the present application. Furthermore, the majority of the software elements depicted in FIG. 1 are also well known in the prior art. The mouse controller 14 and the keyboard controller 16, for example, are likewise software processes which are well known and available in the prior art. The communication controller 13 and the contents of the remote memory 24 are similarly known and can be found in the aforementioned Christensen et al. patent. Moreover, the bitmap manipulation procedures known to the prior art can be used in the present invention because the layer processing software, to be described hereafter, is designed to make the various layers appear to the bitmap operators as virtual terminals upon which the bitmap operators can interact directly. The balance of the present disclosure will be used to describe the software elements in local memory 23 which are necessary to create the various layers and the bitmaps representing those layers in response to input from elements 15, 17, and 18, as well as program output from the remote host computer memory 24 via data link 23.

The programs described herein are written in a pseudo-C dialect and use several simple defined types and primitive bitmap operations.

```
A point is defined as an ordered pair
typedef struct{
int x, y;
}Point;
```

that defines a location in a bitmap such as the screen. The coordinate axes are oriented with x positive to the right and y positive down, with (0,0) in the upper left corner of the screen. A Rectangle is defined by a pair of Points at the upper left and lower right, i.e.,

```
typedef struct{
Point origin;        /* upper left */
Point corner;        /* lower right */
}Rectangle;
```

By definition, corner.x> =origin.x and corner.y> =origin.y.

Rectangles are half-open; i.e., a Rectangle contains the horizontal and vertical lines through the origin, and abuts, but does not contain, the lines through "corner". Two abutting rectangles $r_0$ and $r_1$, with $r_1$.origin=($r_0$.corner.x, $r_0$.origin.y);

therefore have no point in common. The same applies to lines in any direction; a line segment drawn from $(x_0,y_0)$ to $(x_1,y_1)$ does not contain $(x_1,y_1)$. These definitions simplify drawing objects in pieces, which is convenient for the present implementation.

The subroutine rectf(b, r, f) performs the function specified by an integer code f, in a rectangle r, in a bitmap b. The function code f is one of:

| | |
|---|---|
| F_CLR: | clear rectangle to zeros |
| F_OR: | set rectangle to ones |
| F_XOR: | invert bits in rectangle |

The routine bitblt (sb, r, db, p, f) (bit-block transfer) copies a source Rectangle r in a bitmap sb to a corresponding Rectangle with origin p in a destination bitmap db. The routine bitblt is therefore a form of Rectangle assignment operator, and the function code f specifies the nature of the assignment:

| | |
|---|---|
| F_STORE: | dest = source |
| F_OR: | dest \| = source |
| F_CLR: | dest & = ~source |
| F_XOR: | dest = source |

For example, F_OR specifies that the destination Rectangle is formed from the bit-wise OR of the source and destination Rectangles before the bitblt( ) procedure. The routine bitblt( ) is a fundamental bitmap operation. It is used to draw characters, save screen rectangles and present menus. Defined more generally, it includes rectf( ).

In the general case, the data from the source Rectangle must be shifted or rotated and masked before being written to the destination Rectangle. A Rectangle may consist of several tens of kilobytes of memory, so it is possible that a single bitblt( ) may consume a substantial amount of processor time.

A bitmap is a dot-matrix representation of a rectangular image. The details of the representation depend on the display hardware, or, more specifically, on the arrangement of memory in the display. For the idea of a bitmap to mesh well with software in the display, the screen must appear to the program as a bitmap with no special properties other than its visibility. Because images (bitmaps) are stored off-screen, off-screen memory should have the same format as the screen itself, so that copying images to and from the screen is not a special case in the software. The simplest way to achieve this generality is to make the screen a contiguous array of memory, with the last word in a scan line followed immediately by the first word of the next scan line. Under this scheme, bitmaps become simple two-dimensional arrays.

Figure 5:
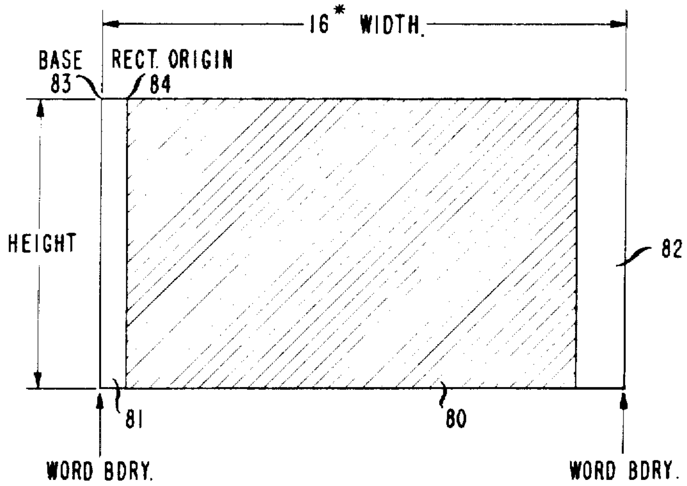
FIG. 5 is a graphical representation of a bitmap storage array useful in understanding the present invention.

Given a two-dimensional array in which to store the actual image, some auxiliary information is required for its interpretation. FIG. 5 illustrates how a bitmap is interpreted. The hatched region 80 is the location of the image. When a bitmap is allocated, the allocation routine, balloc( ), assumes its data will correspond to a screen rectangle, for example, a part of one layer obscured by another. The balloc( ) routine creates the left and right margins of the bitmap to word-align the bitmap with the screen, so word boundaries 81 in the bitmap are at the same relative positions as in the screen. In FIG. 5, the unused margin to the left of the image area in the bitmap is storage wasted to force the word-alignment. If the first bit of the image were always stored at the high bit of first word, there would only be wasted storage at the right edge of the bitmap, but copying the bitmap to the screen would require each full word in the bitmap to be rotated or shifted and masked. Some bitmaps, such as icons, may be copied to an arbitrary screen location, so the word-alignment does not assist them. Other than the extra space, however, no penalty is paid for the bitmap structure's generality, because such images must usually be shifted when copied to the screen, and the choice of origin bit position is, on the average, irrelevant.

The balloc( ) routine takes one argument, the on-screen rectangle which corresponds to the bitmap image, and returns a pointer to a data structure of type Bitmap. Bitmap is defined thus:

```
typedef struct{
Word *base;            /* start of data */
unsigned width;        /* width in words */
Rectangle rect;        /* image rectangle */
}Bitmap;
```

The elements of the structure are illustrated in FIG. 5. Width is in Words, which are a fixed number (e.g., 16) of bits long. The parameter rect is the argument to balloc( ), and defines the coordinate system inside the Bitmap. The storage in the Bitmap outside rect (the unhatched portion 81 in FIG. 5) is unused, as described above. Typically, width is the number of Words across the Bitmap, between the arrows in FIG. 5. A Bitmap may be contained in another Bitmap, however, if width is the width of the outer Bitmap, and "base" points to the first Word in the Bitmap. Although such Bitmaps are not created by balloc( ), they have utility in representing the portion of the screen occupied by a layer. The balloc( ) routine and its obvious counterpart bfree( ) hide all issues of storage management for bitmaps.

The Bitmap structure is used throughout the illustrative embodiment of the present invention. Graphics primitives operate on points, lines and rectangles within Bitmaps, not necessarily on the screen. The screen itself is simply a globally accessible Bitmap structure, called "display," and is unknown within the graphics primitives.

A layer is a rectangular portion of the screen and its associated image. It may be thought of as a virtual display screen. Layers may overlap (although they need not), but the image in the obscured portion of a layer is always kept current. Typically, an asynchronous process, such as a terminal program or circuit design system, draws pictures and text in a layer, just as it might draw on a full screen if it were the only process on the display. Because processes are asynchronous, drawing actions can take place at any time in an obscured layer, and a graphical object such as a line may be partially visible on the screen and partially in the obscured portion of the layer. The layer software isolates a program, drawing in an isolated region on the screen, from other such programs in other regions, and guarantees that the image on- and off-screen is always correct, regardless of the configuration of the layers on the screen.

Layers are different from the common notion of windows. Windows are used to save a programming or working environment, such as a text editing session, to process "interrupts" such as looking at a file or sending mail, or to keep several static contexts, such as file contents, on the screen. Layers are intended to maintain an environment, even though it may change because the associated programs are still running. The term ∓layer" was coined to avoid the more cumbersome phrase "asynchronous windows". Nontheless, the difference between layers and windows is significant. The concept of multiple active contexts is natural to use and powerful to exploit.

Truly asynchronous grahics operations are difficult to support, because the state of a layer may change while a graphics operation is underway. The obvious simple solution is to perform graphical operations atomically. This partially asynchronous strategy is used throughout the present embodiment of the invention. Processes explicitly call the scheduler when they are at a suitable stopping point and there is no interruptive scheduling. Although this technique forces an extra discipline on the programmer (as distinct from a user), it adds little in complexity to the programs implementing the present invention and significantly simplifies the terminal run-time environment. It also avoids many potential race conditions, protocol problems, and difficulties with nonreentrant compiled code for structure-valued functions in C. For the purely single-user environment of a display terminal, such a scheme offers most of the benefits of preemptive scheduling, but with smaller, simpler, software.

The data structures for layers are illustrated in FIGS. 3 and 4. A partially obscured layer has an obscured list: a list of rectangles in that layer obscured by another layer or layers. In FIG. 3, layer A obscures layer B. Layer B's obscured list has a single entry, which is marked "obscured by A." If more than one layer obscures a rectangle, the rectangle is marked as obscured by the frontmost (unobscured) layer intersecting the rectangle. This is illustrated by rectangle 54 in FIG. 4. Rectangle 54 is an obscured part of both layers B and C, so these layers store their obscured pieces off-screen, and mark them blocked by layer A.

Rectangles 53 and 54 (FIG. 4) may be stored as a single rectangle, as they were in FIG. 3. They are stored as two because if layer C is later moved to the front of the screen (i.e. the top of the pile of layers), it will obscure portions of both layers A and B. Rectangle 54 in layer B would be obscured by C, but rectangle 53 would still be obscured by Layer A. To simplify the algorithms for rearranging layers, the layer creation routine does all necessary subdivision when the layer is first made, so when layer C is created, the obscured rectangle in B is split in two along the edge of the new layer.

See Appendix A for the definition of the layer structure.

The first part of the layer structure is identical to that of a Bitmap. Actually, the Bitmap structure has an extra item to it: a NULL obs pointer, so a Bitmap may be passed to a graphics routine expecting a Layer as argument. The operating system in the present invention uses this subterfuge to camouflage Layers. To a user-level program, Layers do not exit, only Bitmaps. The one Layer that the user program sees, "display," is only used for graphics functions, and is therefore functionally a Bitmap to the user program.

The individual Layers are chained together as a double-linked list, in order from "front" to "back" on the screen (when they do not overlap, the order is irrelevant). Besides the link pointers, a Layer structure contains a pointer to the list of obscured rectangles and the bounding rectangle on the screen. The obscured lists are also double-linked, but in no particular order. Each element in the obscured list contains a Bitmap for storing the off-screen image, and a pointer to the frontmost Layer which obscures it. As will be seen later, an Obscured element need only record which (unobscured) Layer is on the screen "in front" of it, not any other obscured Layers which also share that portion of the screen. Obscured.bmap->rect is the screen coordinates of the obscured Rectangle. All coordinates in the layer manipulations are screen coordinates.

The routine layerop( ), shown in Appendix B, is the main interface between layers and the graphics primitives. Given a Layer, a Rectangle within the Layer, and a bitmap operator, it recursively subdivides the Rectangle into Rectangles contained in single Bitmaps, and invokes the operator on the Rectangle/Bitmap pairs. To simplify the operators, layerop( ) also passed along, unaltered, a pointer to a set of parameters to the bitmap operator. For example, to clear a rectangle in a layer, layerop( ) is called with the target Layer, the rectangle within the layer in screen coordinates, and a procedure (the bitmap operator) to invoke rectf( ). The layerop( ) routine divides the rectangle into its components in obscured and visible portions of the layer, and calls the procedure to clear the component rectangles. Routine layerop( ) itself does no graphical operations; it merely controls graphical operations done by the bitmap operator handed to it. It turns a bitmap operator into a layer operator.

The layerop( ) routine first clips the target Rectangle to the Layer, then calls the recursive routine Rlayerop( ) to do the subdivision. See Appendix D for the pseudo-code for Rlayerop.

Rlayerop( ) recursively chains along the obscured list of the Layer, performing the operation on the intersection of the argument Rectangle and the obscured Bitmap, and passing nonintersecting portions on to be intersected with other Bitmaps on the obscured list. When the obscured list is empty, the rectangle must be drawn on the screen.

The code to test if two rectangles overlap is found in Appendix C. The Layer pointer and Obscured pointer are passed to the bitmap operator ((*fn)( )) because, although they are clearly not needed for graphical operations, layerop( )'s subdivision is useful enough to be exploited by some of the software to maintain the layers themselves. Note that if layerop( ) is handed a Layer with a NULL obs pointer, or a Bitmap, its effect is simply to clip the rectangle and call the bitmap operator.

So far, otherargs has been referred to in a deliberately vague manner. The layerop( ) routine works something like printf( ): after the arguments required by layerop( ) (the Layer, bitmap operator and Rectangle), the calling function passes the further arguments needed by the Bitmap operator. The layerop( ) routine passes the address of the first of these arguments through to the operator, which therefore sees a pointer to a structure containing the necessary arguments. Appendix E illustrates the action of layerop( ).

The routine lblt( ) uses layerop( ) and bitblt( ) to copy an offscreen Bitmap to a Rectangle within a Layer. The Bitmap may contain, for example, a character.

There are three basic transformations that can in principle be applied to layers: changing the front-to-back positions of overlapping layers (stacking); changing the dimensions of a layer (scaling); and changing the position of a layer on the screen (translation).

Any stacking transformation can be defined as a sequential set of one-layer rearrangement operations, moving a single layer to another position, such as to the front or back of the stack of layers. For example, the stack can be inverted by an action similar to counting through a deck of cards. The upfront( ) routine is an operator that moves a layer to the front of the stack, making it completely visible. It is the only stacking operator in the layer software, because in the few instances where a different operation is required, the desired effect can be achieved, with acceptable efficiency, by successive calls to upfront( ). The action of pulling a layer to the front was chosen because it is the most natural. When something interesting happens in a partially obscured layer, the instinctive reaction is to pull the layer to the front where it can be studied. The upfront( ) routine also turns out to be a useful operation during the creation and deletion of layers. Scaling and translation operators will not be discussed.

The upfront( ) routine has a simple structure. Most of the code is concerned with maintaining the linked lists. The basic algorithm is to exchange the obscured rectangles in the layer with those of the layer obscuring them, swapping the contents of the obscured bitmap with the screen. Since the obscured rectangle has the same dimensions before and after the swap, the exchange can be done in place, and it is not necessary to allocate a new bitmap; it is only necessary to link it into the new obscured layer. Obscured rectangles are marked with the frontmost obscuring layer for upfront( )'s benefit: the frontmost layer is the layer that occupies the portion of the screen the rectangle would occupy were it at the front. See Appendix F for the pseudo-code for the operator upfront( ).

The screenswap( ) routine interchanges the data in the bitmap with the contents of the rectangle on the screen, in place. It is easily implemented, without auxiliary storage, using three calls to bitblt( ) with function code F_XOR. Note that because of the fragmentation of the obscured portions done when a new Layer is created, if lp->rect and op->bmap->rect intersect, the Layer must completely obscure it. Note also that it is upfront( ) which enforces the rule that the frontmost Layer obscuring a portion of a second Layer is the layer marked as obscuring it. Only if these two Layers are interchanged is the screen updated.

It is simpler to delete a Layer than to create one. The algorithm is:

(1) Pull the layer to the front. It now has no obscured pieces, and is a contiguous rectangle on the screen.
(2) Color the screen rectangle the background color.
(3) Push the layer to the back. All storage needed for the obscured portions of the layer is now bound to the layer, since it obscures no other layer.
(4) Free all storage associated with the layer.
(5) Unlink the layer from the layer list.

A special routine, the opposite of upfront( ), could be written to push the layer to the back, but upfront( ) can be used for the task. See Appendix G for the dellayer pseudo-code.

Successive calls to upfront( ) push a layer to the back. The upfront( ) routine does not join disconnected obscured bitmaps which could be joined because of the deletion.

Making a new layer may require modifying obscured lists of other layers. If the new layer creates any new overlaps, the obscured list of the overlapped layer must be restructured so that upfront( ) need not subdivide any rectangles to pull the obscured layer to the front. The creation routine, newlayer( ) is shown in Appendix J.

The basic structure of newlayer( ) is to build the layer at the back, constructing the obscured list by intersecting the layer's rectangle with the obscured rectangles and visible portions of the current layers. After allocating storage for the obscured bitmaps, the layer is pulled to the front, making it contiguous on the screen and forcing the rectangles obscured by the new layer to contain the new storage required by the addition of the new layer. Finally, the screen rectangle occupied by the new layer is cleared to complete the operation.

Several ancillary routines are used by newlayer( ). The addrect( ) routine adds rectangles to the obscured lists, obs, of the new layer. Since the new layer is built at the "back" of the screen, any obscured rectangle of the new layer will be obscured by a layer already on the screen. The addrect( ) routine builds the list of unique obscured rectangles, marked by which layer is currently occupying the screen in each rectangle. To be sure that a rectangle is unique, it is sufficient to check just the origin point of the rectangle. The rectangles passed to addrect( ) are ordered so that the first layer associated with a particular rectangle occupies the screen in that rectangle. See Appendix H for the addrect( ) pseudo-code.

The addobs( ) routine does recursive subdivision of the obscured rectangles that intersect the new layer, calling addrect( ) when an overlap is established. It is similar to layerop( ) except that it does not chain along the obscured list, and no special action (i.e., storage allocation) is required if the rectangles match exactly. As subdivided pieces are added to the obscured list of a current layer, the original rectangle must remain in the list until all the subdivided pieces are also in the list, whereupon it is deleted. New pieces must therefore be added after the original piece. When the topmost call to addobs( ) returns, the subdivision (if any) is complete, and the return value is whether the argument rectangle was subdivided. The newlayer( ) routine then removes the original rectangle from the list if addobs( ) returns TRUE. The pseudo-code for addobs is illustrated in Appendix I.

The newlayer( ) routine (Appendix J) takes an argument Bitmap, which is typically the screen Bitmap display, but may be any other. It is a simple generalization from Layers within Bitmaps to Layers within Layers, and a true hierarchy.

The addpiece( ) routine is a trivial routine to add to the obscured list the rectangles that are currently unobscured (i.e., have only one layer) but that will be obscured by the new layer. Appendix K is the pseudo-code for addpiece( ).

APPENDIX A

```
typedef struct{
        Word *base;          /* start of data */
        unsigned width;      /* width in words */
        Rectangle rect;      /* image rectangle  */
        Obscured *obs;       /* linked list of
                                obscured rectangles */
        Layer *front;        /* adjacent layer in
                                front */
        Layer *back;         /* adjacent layer
                                behind */
} Layer;
typedef struct{
        Layer *lobs;         /* frontmost obscuring
                                Layer */
        Bitmap *bmap;        /* where the obscured
                                data resides */
        Obscured *next;      /* chaining */
        Obscured *prev;
} Obscured;
/*
```

APPENDIX B

```
/*
 * Clip to outer rectangle of layer,
 * then call Rlayerop()
 */
 layerop(lp, fn, r, otherargs)
       Layer *lp;
       void (*fn)();   /* Pointer to
                          bitmap operator */
       Rectangle r;
       misc otherargs; /* Other arguments
                          used by (*fn)() */
 {
       r=intersection of r and
       lp->rect;
       if(r not null)
            Rlayereop(lp, fn, r, otherargs,
                      lp->obs);
 }
```

APPENDIX C

```
rectXrect(r, s)    /* Do r and s
                      intersect? */
     rectangle r, s;
{
#define c corner
#define o origin
     return(r.o.x<s.c.x && x.o.x.<r.c.x
            && r.o.y<s.c.y. && s.o.y<r.c.y);
}
```

APPENDIX D

```
/*
 * Rlayerop -- recursively subdivide and intersect
 *             rectangles with obscured bitmaps
 */           in layer
Rlayerop(lp, fn, r, otherargs, op)
      Layer *lp;
      void (*fn)();
      Rectangle r;
      misc otherargs;
      Obscured *op;  /* Element of obscured list
                        with which to intersect
                        r */
{
```

```
        if(op==NULL)    /* This rectangle not
                           obscured */
          (*fn)(lp, r, &display, otherargs, op);
                        /* Draw on screen */
        else if(rectXrect(r, op->bmap->rect)==FALSE)
                        /* They miss */
          Rlayerop(lp, fn, r, otherargs, op->next);
                        /* Chain */
        else{           /* They must intersect */
          if(r.origin.x < op->bmap->rect.origin.x){
               Rectangle temp=piece of r left of
               op->bmap->rect;
               Rlayerop(lp, fn, temp,
               otherargs, op->next);
               r->origin.x=op->bmap->rect.origin.x;
          }
          /* etc. for other three sides of
             rectangle */
          /* What's left goes in this obscured
             bitmap */
          (*fn)(lp, r, op->bmap, otherargs, op);
        }
}
```

APPENDIX E

```
Lblt(l, r, db, fp, o)
        Layer *l;
        Rectangle r;
        Bitmap *db;         /* Destination Bitmap */
        struct{
             Bitmap *sb;    /* Source Bitmap */
             int f;         /* Function code */
        } *fp;
        Obscured *o;
{
        bitblt(fp->sb, r, db, r.origin, fp->f);
}
lblt(l, sb, r, f)
        Layer *l;
        Bitmap *sb;
        Rectangle r;
{
        layerop(l, Lblt, r, sb, f);
}
```

APPENDIX F

```
/*
 * upfront - pull layer to the front of the screen
 */
upfront(lp)
        Layer *lp;
{
        Layer *fr;      /* a layer in front of lp */
        Layer *beh;     /* a layer behind lp */
        Obscured *op;

        for(fr=each layer in front of lp){
            for(op=each obscured portion of lp){
                if(op->lobs==fr){
                        /* fr obscures op */
                    screenswap(op->bitmap, op->rect);
                    unlink op from lp;
                    link op into fr;
                }
            }
        }
        move lp to front of layer list;
        for(beh=all other Layers from back to front)
            for(op=each obscured portion of beh)
                if(lp->rect overlaps op->bmap->rect)
                    op->lobs=lp;
                        /* mark op obscured by lp */
}
```

APPENDIX G

```
/*
 * dellayer -- delete a layer
 */
dellayer(lp)
        Layer *lp;
{
        Obscured *op;

        upfront(lp);
        background(lp->rect);
        /* Push to back using upfront */
        while(lp!=rearmost layer)
             upfront(rearmost layer);
        /* Free the storage */
        for(op=each obscured part of lp){
             bfree(op->bmap);
             free(op);
        }
        unlink lp from Layer list;
}
```

APPENDIX H

```
/*
 * addrect -- add (unique) rectangle to
 *            obscured list of new layer
 */
Obscured *obs;          /* Pointer to obscured list
                           for new layer */
addrect(r, lp)
        Rectangle r;
        Layer *lp;      /* Layer currently occupying
                           r on screen */
{
        Obscured *op, *newop;

        for(op=each element of obs)
            if(op->rect.origin == r.origin)
               return;    /* Not unique */
        newop=new Obscured;
        newop->rect=r;
        newop->lobs=lp;
        link newop into obs list;
}
```

APPENDIX I

```
/*
 * addobs -- add obscured rectangle to list,
 *           subdividing obscured portions
 *           of layers as necessary
 */
int
addobs(op, argr, newr, lp)
       Obscured *op;
       Rectangle argr;    /* Obscured rectangle */
       Rectangle newr;    /* Complete rectangle of
                             new layer */
       Layer *lp;         /* Layer op belongs to */
{
       Obscured *newop;
       Rectangle r;
       Bitmap *bp;

       r=argr;            /* argr will be unchanged
                             through addobs() */
       if(rectXrect(r, newr)){
              /* This is much like layerop() */
              if(r.origin.x < newr.origin.x){
                 Rectangle temp=piece of r left
                  of newr;
                 addobs(op, temp, newr, lp);
                 r.origin.x=newr.origin.x;
              }
```

```
        /* etc. for other three sides */
        /* r is now contained in rectangle
           of new layer */
        if(r ==argr){       /* no clip, just
                               bookkeeping */
           addrect(r, lp);
           return FALSE;    /* No sub-
                               division */
        }
        addrect(r, lp);
   }
   bp=balloc(r);
   newop=new Obscured;
   /* Copy the subdivided portion of
      the image */
   bitblt(op->bmap, r, bp, bp->rect.origin,
          F_STORE);
   newop->bmap=bp;
   newop->rect=r;
   newop->lobs=lp;     /* Layer lp obscures
                          this part of the
                          new layer */
   link op into lp->obs;
   return TRUE;        /* Subdivision */
}
```

```
Obscured obs;     /* obscured list of new layer
                     when at back */
/*
 * newlayer -- make a new layer in rectangle r
 *             of bitmap *bp
 */
Layer *
newlayer(bp, r)
         Bitmap *bp;
         Rectangle r;
{
         Layer *lp, *newlp;
         Obscured *op;

         /*
          * First build, in obs, a list of all
          * obscured rectangles which will be
          * obscured by the new layer,
          * doing subdivision with addobs()
          */
```

```
        obs=NULL;
        for(lp=each layer from front to back){
            for(op=each obscured portion of lp){
                if(rectXrect(r, op->rect) &&
                   addobs(op, op->rect, r, lp)){
                        unlink op from lp->obs;
                        bfree(op->bmap);
                        free(op);
                }
            }
        }
        /*
         * Now add the rectangles not currently
         * obscured, but that will be obscured
         * by new layer, by building layer
         * & calling layerop
         */
        newlp=new Layer;
        Bitmap part of newlp=*bp;
        newlp->obs=obs;     /* Currently obscured
                               ... */
        for(lp=each layer from front to back)
            layerop(lp, addpiece, lp->rect);
        newlp->obs=obs;     /* ... and soon
                               to be */
        for(op=each element of obs)
            op->bmap=balloc(op->rect);
        link newlp into back of layer list;
        upfront(newlp);
        rectf(newlp->rect,    /* Clear the
              F_CLR);            screen rectangle */
        return newlp;
}
```

APPENDIX K

```
addpiece(lp, r, bp, otherargs, op)
        Layer *lp;
        Rectangle r;
        Bitmap *bp;
        char *otherargs;    /*Unused */
        Obscured *op;
{
        if(op==NULL)        /* This piece occupied
                               by one layer only */
            addrect(r, lp);
        /* Otherwise it's already in obs list */
}
```

What is claimed is:

1. A computer terminal display system comprising
a display surface,
means for simultaneously displaying a plurality of overlapping rectangular graphic layers on said surface, wherein each of said graphic layers comprises an autonomous level of graphical information,
means for associating each of said graphic layers with an independent computer program,
means for storing a complete bitmap for each of said graphic layers, and
means responsive to the associated one of said independent computer programs for continuously updating each of said bitmaps.

2. The display system according to claim 1 wherein said bitmaps for all partially obscured ones of said graphic layers comprise a plurality of partial bitmaps of obscured areas linked together.

3. The display system according to claim 2 wherein said interacting means includes a keyboard.

4. The display system according to claim 1 further comprising means for selectively interacting with any one of said graphic layers.

5. The display system according to claim 4 wherein said interacting means comprises a graphical cursor control device.

6. The display system according to claim 1 further comprising means for selectively displaying any one of said graphic layers in the topmost unobscured position.

7. A graphics terminal comprising
a display,
a keyboard,
a graphics control device, and
programmed apparatus for controlling said terminal, said apparatus comprising
means responsive to said control device for creating a plurality of overlapping display layers on said display, wherein each of said display layers comprises an autonomous level of graphical information, and
means for associating each of said display layers with an independent computer program, and
means responsive to said keyboard for interacting with any selected one of said display layers to create, execute and display the output of an independent computer program.

8. The graphics terminal according to claim 7 further comprising
means for creating a bitmap corresponding to each of said display layers, and
means for maintaining each said bitmap current in response to said interacting means.

9. The graphics terminal according to claim 8 further comprising
means for creating a separate partial bitmap for each obscured portion of all of said layers except the top layer, and
means for maintaining an obscured bitmap list of all such partial bitmaps for each said layer.

10. The graphics terminal according to claim 9 wherein each said obscured bitmap list includes a specification of the size and position of the associated one of said layers.

11. The graphics terminal according to claim 7 where said means for creating, executing and displaying the output of independent computer programs includes a digital computer remote from said graphics terminal, and
means for communicating between said graphics terminal and said remote digital computer.

12. The method of supporting a plurality of virtual computer graphical terminals on a single physical terminal including a display screen comprising the steps of
identifying a plurality of overlapping working areas on said screen,
associating each said working area with an independent computer program,
selectively communicating data to each said program through its associated working area, and
continually displaying the output from each said computer program on its associated working area.

13. The method according to claim 12 further comprising the step of
maintaining full bitmaps of each of said working areas, including both visible portions and portions obscured by others of said working areas, and
utilizing said obscured area bitmaps to record corresponding portions of the output of said associated programs.

14. The method according to claim 13 further including the step of
maintaining a list of all of the obscured area bitmaps associated with each of said working areas.

15. The method according to claim 14 further including the step of
selectively bringing any one of said working areas to full visibility by assembling said obscured area bitmaps.

* * * * *

US004555775B1

REEXAMINATION CERTIFICATE (2745th)

United States Patent [19] [11] B1 4,555,775

Pike [45] Certificate Issued Dec. 5, 1995

[54] DYNAMIC GENERATION AND OVERLAYING OF GRAPHIC WINDOWS FOR MULTIPLE ACTIVE PROGRAM STORAGE AREAS

[75] Inventor: Robert C. Pike, Berkeley Heights, N.J.

[73] Assignee: Bell Telephone Laboratories, Incorporated, Murray Hill, N.J.

Reexamination Request:
No. 90/002,424, Aug. 30, 1991

Reexamination Certificate for:

| | |
|---|---|
| Patent No.: | **4,555,775** |
| Issued: | **Nov. 26, 1985** |
| Appl. No.: | **433,261** |
| Filed: | **Oct. 7, 1982** |

[51] Int. Cl.[6] ................................ G09G 5/14; G06F 3/14

[52] U.S. Cl. ........................ 395/158; 345/120; 364/923.5; 364/923.81; 364/926.9; 364/927.2; 364/927.4; 364/927.61; 364/927.63; 364/927.631; 364/927.7; 364/927.92; 364/927.93; 364/928; 364/929.1; 364/929.12; 364/929.3; 364/933.9; 364/942; 364/942.07; 364/943; 364/948.3; 364/959; 364/978; 364/978.3; 364/DIG. 2; 395/157

[58] Field of Search .................................... 395/157, 158, 395/153; 340/721, 734; 345/120

[56] References Cited

U.S. PATENT DOCUMENTS

| | | | |
|---|---|---|---|
| 4,069,511 | 1/1978 | Lelke | 364/200 |
| 4,103,331 | 7/1978 | Thacker | 364/200 |
| 4,197,590 | 4/1980 | Sukonick et al. | 345/201 |
| 4,360,831 | 11/1982 | Kellar | 358/182 |
| 4,414,628 | 3/1981 | Ahuja et al. | 395/158 |

OTHER PUBLICATIONS

Greenfield "Practical Digital Design Using ICs", 2nd edition 1977, pp. 564–565.

W. Teitelman, *Ten Years of Window Systems–A Retrospective View,* in Hopgood et al., eds., *Methodology of Window Management* (Springer–Verlag, New York 1986), pp. 35–46.

Cotter "The Amazing 1802: D/A and A/D Applications", Kilobaud, Aug. 1978, pp. 102–107.

"Bruwin: An Adaptable Design Strategy for Window Manager/Virtual Terminal Systems", N. Meyrowitz et al., ACM, 1981, pp. 180–189.

"Virtual Terminal Management in a Multiple Provess Environment", K. A. Lantz and R. F. Rashid, *Proc. 7th Symposium on Operating Systems. Principles,* ACM, Dec. 1979, pp. 86–96.

"The Smalltalk Environment", Larry Tesler, *Byte Publications,* Aug. 1981, pp. 90–147.

"The Smalltalk Graphics, Kernel", Daniel H. H. Ingalls, *Byte Publications,* Aug. 1981, pp. 158–194.

"The Smalltalk–76 Programming System Design and Implementation", Daniel H. H. Ingalls, *Conf. of the Fifth Ann. ACM Symposium on Principles of Programming Languages,* pp. 9–15, 1978.

"A display oriented programmer's assistant", Warren Teitelman, 1979 Academic Press Inc. (London) Limited, pp. 157–187.

"Computer Graphics–Principles and Practice", James D. Foley et al., Addison–Wesley Publishing Company, 1990, pp. 996–998.

"Grapics in Overlapping Bitmap Layers", Rob Pike, *ACM–Transactions on Graphics,* Apr. 1983, pp. 135–160.

"An Adaptable Design Strategy for Window Manager/Virtual Terminal Systems", by N. Meyrowitz et al, ACM, 1981, pp. 180–189.

*Primary Examiner*—Thomas C. Lee

[57] ABSTRACT

A graphic terminal is disclosed using bitmaps to represent plural overlapping displays. Graphics software is also disclosed in which the overlapping asynchronous windows or layers are manipulated by manipulating the bitmaps. With this software, the physical screen becomes several logical screens (layers) all running simultaneously, any one of which may be interacted with at any time.

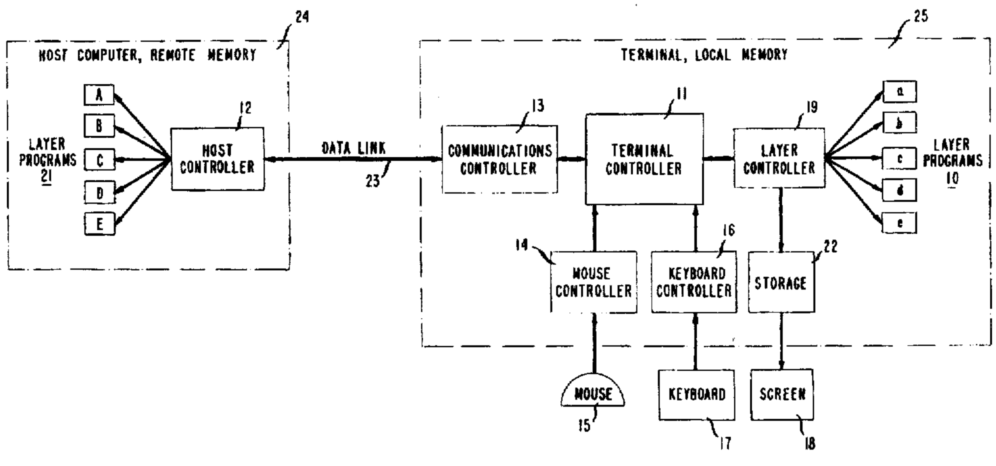

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–6, 8–10, and 13–15 is confirmed.

Claims 7 and 12 are now disclaimed.

Claim 11 is determined to be patentable as amended.

11. The graphics terminal according to claim [7] *8* where said means for creating, executing and displaying the output of independent computer programs includes a digital computer remote from said graphics terminal, and means for communicating between said graphics terminal and said remote digital computer.

* * * * *